United States Patent [19]

Krichever et al.

[11] Patent Number: 5,200,599
[45] Date of Patent: Apr. 6, 1993

[54] SYMBOL READERS WITH CHANGEABLE SCAN DIRECTION

[75] Inventors: Mark Krichever, Hauppauge; Boris Metlitsky, Stony Brook, both of N.Y.

[73] Assignee: Symbol Technologies, Inc, Bohemia, N.Y.

[21] Appl. No.: 912,666

[22] Filed: Jul. 14, 1992

Related U.S. Application Data

[60] Continuation of Ser. No. 721,951, Jun. 27, 1991, abandoned, which is a division of Ser. No. 510,674, Apr. 13, 1990, Pat. No. 5,059,779, which is a continuation-in-part of Ser. No. 367,335, Jun. 16, 1989, Pat. No. 5,124,539.

[51] Int. Cl.5 .............................. G06K 7/10
[52] U.S. Cl. .................... 235/472; 235/467
[58] Field of Search ........... 235/462, 472, 467, 470; 250/236; 359/220, 221, 223, 224

[56] References Cited

U.S. PATENT DOCUMENTS

| | | | |
|---|---|---|---|
| 3,629,827 | 12/1971 | Johnston et al. | 382/48 |
| 3,889,102 | 6/1975 | Dahlquist | 235/467 |
| 3,970,825 | 7/1976 | Plockl | 235/467 |
| 4,006,343 | 2/1977 | Izura et al. | 235/467 |
| 4,057,784 | 11/1977 | Tafoya | 235/467 |
| 4,333,006 | 6/1982 | Gorin et al. | 235/457 |
| 4,418,276 | 11/1983 | Yatsunami | 235/467 |
| 4,560,862 | 12/1985 | Eastman et al. | 235/467 |
| 4,673,805 | 6/1987 | Shepard et al. | 235/472 |
| 4,795,224 | 1/1989 | Goto | 235/467 |
| 4,816,661 | 3/1989 | Krichever et al. | 235/472 |
| 4,831,275 | 5/1989 | Drucker | 235/472 |
| 4,851,667 | 7/1989 | Mergenthaler et al. | 250/236 |
| 4,871,904 | 10/1989 | Metlitsky et al. | 235/467 |
| 4,938,551 | 7/1990 | Matsumoto | 235/467 |
| 4,962,980 | 10/1990 | Knowles | 235/467 |
| 4,967,076 | 10/1990 | Schuhmacher et al. | 235/467 |

FOREIGN PATENT DOCUMENTS 53-26140  3/1978  Japan ..................... 235/467

*Primary Examiner*—Robert Weinhardt

[57] ABSTRACT

The scan direction of at least one scan line is changeable in a scanner for reading bar code symbols by selectively reversing a drive.

9 Claims, 9 Drawing Sheets

SYMBOL READERS WITH CHANGEABLE SCAN DIRECTION

CROSS-REFERENCE TO RELATED APPLICATIONS

This application is a continuation of Ser. No. 07/721,951 now abandoned which is division of application Ser. No. 510,074, filed Apr. 13, 1990, now U.S. Pat. No. 5,059,779, which, in turn, is a continuation-in-part of pending U.S. application Ser. No. 367,335, filed Jun. 16, 1989 now U.S. Pat. No. 5,124,539.

BACKGROUND OF THE INVENTION

1. Field of the Invention

This invention generally relates to laser scanning systems for reading bar code symbols and, more particularly, to scan pattern generators for generating scan patterns with changeable scan directions which extend across the symbols to be read.

2. Description of the Related Art

Laser scanning systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,806,742; 4,808,804; 4,825,057; 4,816,661; 4,816,660; 4,845,350; 4,835,374; 4,871,904; 4,896,026; as well as U.S. application Ser. Nos. 193,265 now U.S. Pat. No. 5,144,120 —all of said patents and patent application being owned by the assignee of the, instant invention and being incorporated as specified below by reference herein—have generally been designed to read bar code symbols, particularly of the Universal Product Code (UPC) type, at a certain working or reading distance from a hand-held or stationary scanner, and with a reading spot of a certain size, the spot being scanned over each symbol to trace a scan line.

It has previously been proposed to generate scan patterns of mutually parallel scan lines extending along one or two directions, as well as omni-directional scan patters of intersecting scan lines, and even curvilinear scan patterns, for superposition over the symbol to be read to insure that, no matter what the angular orientation of a respective symbol might be within predetermined limits, at least one of the scan lines or part of the pattern will be scanned over the entire length of the respective symbol. Yet, the known patterns are generated by highly complex and expensive systems.

Also, quite apart from the angular orientation of the symbols to be read, one symbol might be located close-in to the scanner, whereas another symbol might be located far-out from the scanner and, in short, successive symbols may be located at different working distances from the scanner. In the case of a scanner which has been designed to read symbols within a certain range of working distances, should it occur that a particular symbol falls outside this range, then the distance between the scanner and the symbol must be adjusted, and usually within a short time interval, for, otherwise, the symbol will not be read. In the case of a hand-held scanner, the scanner is usually manually moved toward or away from the symbol to adjust the distance between the scanner and the symbol. This can be a tiring procedure and require multiple reading attempts. It would be desirable, therefore, if the scan pattern generators also incorporated a so-called "zoom" characteristic in which the working distance is automatically changed during scanning.

It would further be desirable to change the scan pattern to further insure that at least one of the scan lines, or part of the pattern, will scan the entire length of the symbol to be read. Some symbols may be more rapidly or successfully decoded and read by a particular scan pattern.

In the same vein, changing the scan rate from a slow to a faster speed, or vice versa, might spell the difference between a successful and a non-successful decoding and reading of a particular symbol.

In order to minimize power consumption, which is of especial concern in a hand-held scanner having an on-board battery, it would be desirable to vary the intensity of the light beam emitted by a light source, typically a laser, mounted within the scanner For example, the light source, rather than, for instance, being shut down when a symbol is not being read, may be underpowered to generate a low power laser beam which would be useful during aiming. Thereupon, during reading, the laser may be powered up to generate a high power laser beam.

SUMMARY OF THE INVENTION

1. Objects of the Invention

It is a general object of this invention to advance the state of the art of laser scanning systems for reading bar code symbols.

It is another object of this invention to generate scan patterns of mutually parallel lines or of intersecting lines over the symbol with a relatively simple pattern generator system, with the option of simultaneously changing the working distance of the outgoing laser beam.

It is a further object of this invention to generate a bidirectional scan pattern of mutually parallel scan lines, at least one scan line scanning in one direction, and at least another scan line scanning in an opposite direction.

It is an additional object of this invention to change the scan pattern generated by the system.

Still another object of this invention is to change the intensity of the laser beam generated by the system.

Yet another object of this invention is to change the scan rate of the system.

Still a further object of this invention is to either automatically or manually change the scan pattern, laser beam intensity, scan rate, or direction of at least one of the scan lines.

2. Features of the Invention

In keeping with these objects, and others which will become apparent hereinafter, one feature of this invention resides, briefly stated, in an optical arrangement for use in a laser scanning system for reading symbols particularly bar code symbols having alternate bars and spaces arranged in a pattern which, when decoded, identify an object on which the symbol is affixed. The scanning system comprises a housing having an exit port, a laser source, e.g. a gas laser tube or a semiconductor laser diode, for generating a laser beam, and scanning means in the housing for scanning the laser beam in scans across successive symbols located exteriorly of the housing. The optical arrangement comprises optical means in the housing for directing the scanning beam along an optical path through the exit port, and for optically forming the scanning beam with a cross-sectional beam spot of a predetermined waist size and at a predetermined distance from the exit port of the housing.

More particularly, this invention is embodied in pattern means for generating a scan pattern of mutually parallel scan lines extending linearly across each symbol. The scan lines are arranged over the height of the symbol. At least one of the scan lines sweeps across each symbol along one sweep direction, whereas, at least another of the scan lines sweeps across each symbol along an opposite sweep direction countercurrent to said one sweep direction, thereby forming a bidirectional scan in which a respective symbol can be read by the first available scan line no matter what its sweep direction. This improves reading speed.

In one advantageous embodiment, the pattern generating means includes a planar rotary mirror constituted of a light-refractive material having an index of refraction and having opposite major mirror surfaces spaced apart by a mirror thickness. The mirror surfaces extend generally parallel to a shaft axis of an output shaft of a scanning drive. One of the mirror surfaces has a lightreflecting coating thereon. The mirror is impinged at an angle of incidence by the laser beam, and a pair of folding mirrors are arranged for reflecting the light reflected off the mirror through the exit port of the housing. The scan lines are spaced apart from one another in a direction parallel to the shaft axis due to the index of refraction, the thickness of the rotary mirror, and the angle of incidence of the impinging laser beam on the rotary mirror.

In another embodiment of the pattern generating means, both opposite major mirror surfaces of the rotary mirror are provided with light-reflecting coatings. The mirror surfaces extend at an acute angle relative to the shaft axis. During rotation of the output shaft during scanning, the laser beam impinges on both mirror surfaces to generate the scan lines positioned across the height of each symbol.

Yet another feature resides in generating an omnidirectional scan pattern of intersecting scan lines over each symbol. A rotary mirror is mounted on a shaft for rotation about the shaft axis during scanning. This mirror has a light-reflecting coating on a surface which extends at an angle to the shaft axis. A plurality of folding mirror are arranged about the rotary mirror to generate the omnidirectional pattern. One of the folding mirrors may be movable so as to change the length of the optical path of the outgoing laser beam. By changing the length of the optical path, the predetermined working distance of the beam spot is changed during scanning. This so-called "zoom" feature enables the scan pattern to read close-in and far-out symbols.

Still other features are embodied in changing the scan pattern and/or scan direction and/or intensity of the laser beam, and/or scan rate in such systems. Any one or more of these system characteristics can be automatically changed, e.g. by a software program, or can be manually changed, e.g. by an actuator mounted on a hand-held head in such systems. The actuator can advantageously be incorporated in a manually-operable trigger operative to initiate reading of a symbol by designing the trigger as a multi-position switch. In a first position, for example, the laser can be made to generate a laser beam of low intensity to facilitate aiming the head at a symbol; or, the scan pattern can be a linear scan or beam spot to facilitate placement on the symbol; or, the scanning can be conducted at a slow or at a zero rate to conserve power. In the second position, for example, the laser beam can be generated at a higher light intensity, or with a different scan pattern or scan rate to insure that the decoding and reading will be successful, even for poorly printed symbols.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 1:
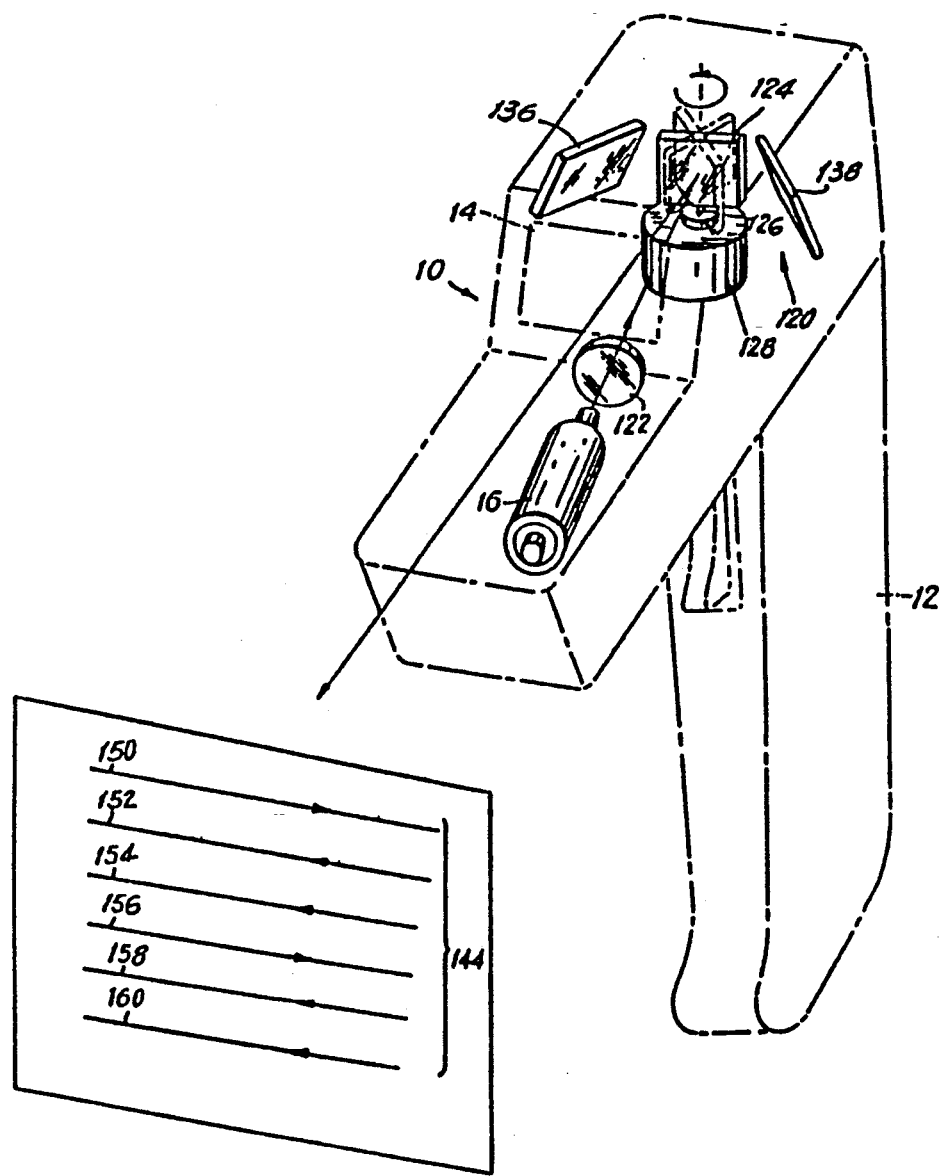
FIG. 1 is a diagrammatic view of a scan pattern generator for generating multiple scan lines in a laser scanning system in accordance with this invention.

Referring now to the drawings, reference al 10 in FIG. 1 generally identifies an arrangement in a laser scanning system of the type generally described in the above-identified patents and patent applications, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alpha-numeric characters.

The arrangement 10 includes a housing 12, shown in dashed lines, and intended to represent either hand-held, desk-top workstation, or stationary scanner, housings having an exit port 14 through which an outgoing laser light beam is directed to impinge on, and to be scanned across, symbols located exteriorly of the housing, each symbol to be scanned and read in its respective turn. A laser source, e.g. a gas laser tube 16 or a semi-conductor laser diode, is mounted in the housing and, when energized, the source 16 generates a laser beam.

A multiple line scan pattern generator 120 is illustrated in FIGS. 1 and 2A–F, and is operative for generating not only multiple scan lines or traces across a symbol to be read, but also for positioning at least some of the scan lines at different working distances from the housing 12 in which the generator 120 is housed. Another feature of generator 120 resides in the bidirectional nature of the resulting scan pattern.

Figure 3A:
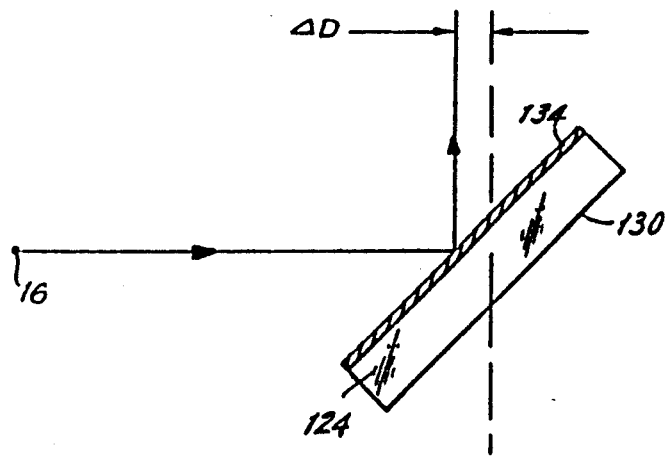
FIG. 3A is a diagrammatic view of another scan pattern generator during one stage of scanning.
Figure 3B:
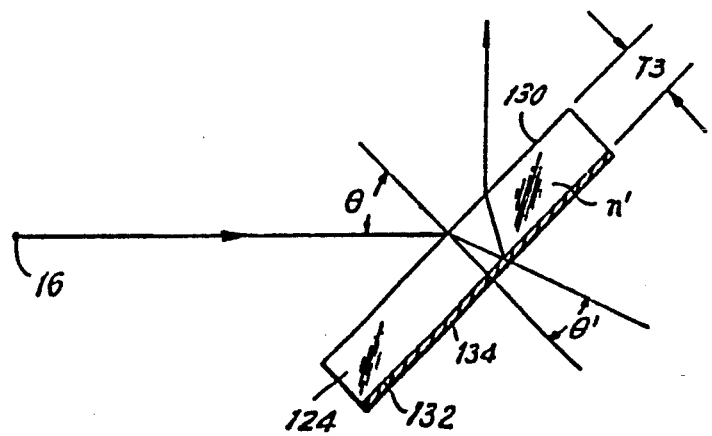
FIG. 3B is a diagrammatic view of the scan pattern generator of FIG. 3A during another stage of scanning.

Laser source 16 directs a laser beam through optical lens 122 for directing the beam onto rotary main mirror 124 which is mounted on a vertical shaft 126 which is rotated by a motor drive 128 about a vertical axis. As shown in enlarged view of FIG. 3B, mirror 124 has opposite major planar surfaces 130 and 132 which are separated by a mirror thickness dimension $T_3$. A light-reflecting coating 134 is applied over one of the surfaces, e.g. 132.

The generator 120 also includes a pair of stationary first surface side mirrors 136, 138 inclined at angles relative to the vertical axis of the shaft 126, and also including an angle with each other. Side mirrors 136, 138 have front surfaces on which light-reflecting coatings 140, 142 are respectively applied. Inclined side mirrors 136, 138 are so positioned relative to main mirror 124 that, during rotation of mirror 124, laser light impinging on mirror 124 will, at certain times, during each revolution of mirror 124, be directed toward one of the side mirrors for reflection therefrom forwardly to an exterior symbol.

Figure 2A:
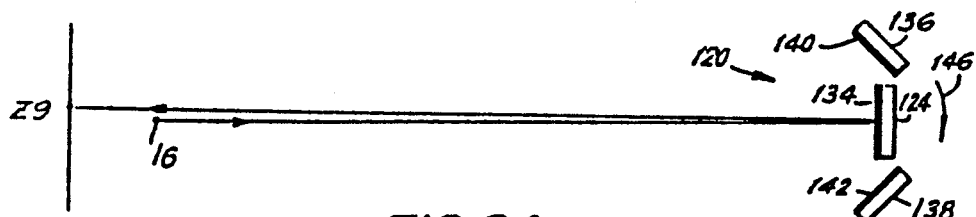
FIG. 2A is a top plan, diagrammatic view of the scan pattern generator of FIG. 1 during one stage of scanning.
Figure 2B:
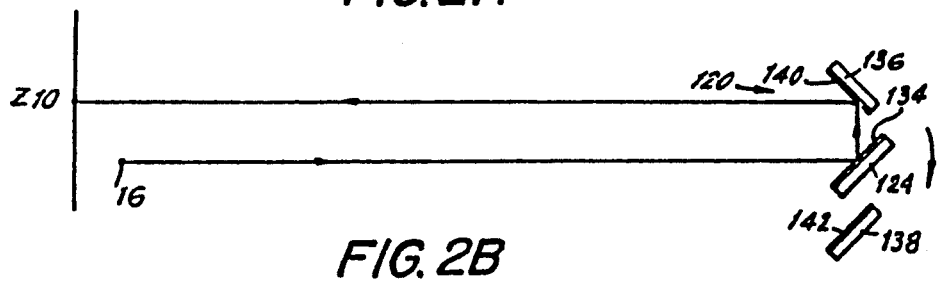
FIG. 2B is a view analogous to FIG. 2A, but at another stage of scanning.

The bidirectional multiple scan line pattern 144 depicted in FIG. 1 is generated as follows: Assume that mirror 124 is initially positioned as shown in FIG. 2A with its coated surface 134 directly facing laser source 16. The laser beam emitted by source 16 is returned along the same optical path (shown slightly separated for ease of illustration) for impingement on a symbol located at distance Z9. During rotation of mirror 124 about the FIG. 2A position, scan line 150 is generated. Eventually, after movement of mirror 124 in the circumferential direction of arrow 146, the mirror 124 will be oriented as shown in FIG. 2B, wherein the mirror 124 directs the laser beam incident thereon to side mirror 136 for reflection by coated surface 140 forwardly for impingement on a symbol located at distance Z10. Z10 is shorter than Z9 due to the diversion of the beam to side mirror 136. During rotation of mirror 124 about the FIG. 2B position, scan line 152 is generated. Scan line 152 is swept in the opposite direction to that of scan line 150.

Figure 2C:
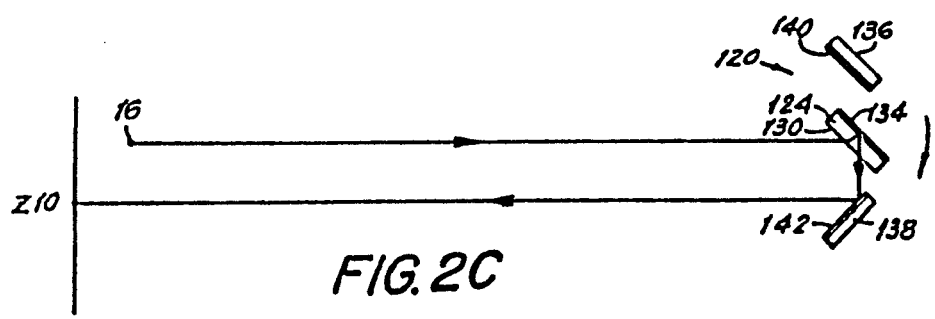
FIG. 2C is a view analogous to FIG. 2B, but at still another stage of scanning.

Eventually, the mirror 124, during further rotation in direction of arrow 146, is oriented in the FIG. 2C position, wherein the coated surface 134 faces away from the laser source 16 so that the laser beam must initially pass through non-coated surface 130 of mirror 124 prior to reaching the rear coated surface 134. As shown in enlarged view in FIG. 3B, this incident beam impinges at an angle of incidence $\theta$, whereupon the beam is refracted at an angle $\theta'$ to the extend determined by the index of refraction $n'$ of mirror 124. The refracted beam reflects off coated surface 134 until it is again refracted at the mirror/air surface 130. A comparison of FIGS. 3A and 3B reveals that the positional shift $\Delta D$ between the beam reflected solely off coated surface 134 in the FIG. 2B situation and the beam leaving the mirror 124 after having been refracted therein is:

$$\Delta D = 2T_3 \sin \theta \left( 1 - \frac{\cos \theta}{\cos \theta' \cdot n'} \right)$$

Returning to FIG. 2C, the refracted beam exiting mirror 124 is directed to coated surface 142 of the side mirror 138 for reflection forwardly to a symbol located at working distance Z10. Rotation of mirror 124 about the FIG. 2C position generates scan line 154 which is swept in the same direction as scan line 152.

Figure 2D:
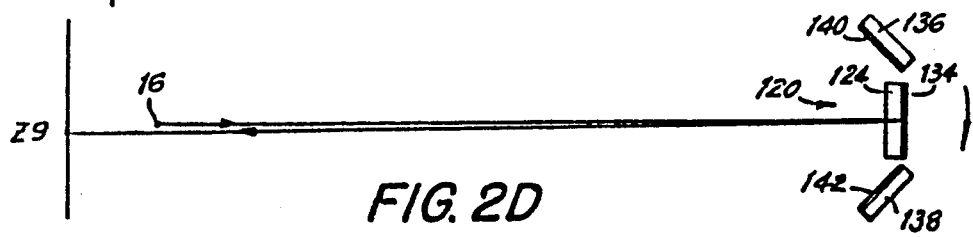
FIG. 2D is a view analogous to FIG. 2C, but at yet another stage of scanning.

In analogous manner to that described earlier in connection with FIG. 2A, further rotation of the mirror 124 eventually orients the mirror 124 to the FIG. 2D position, wherein the coated surface 134 converts the mirror 124 into a second surface mirror. In this case, the incoming beam must pass through the mirror thickness $T_3$ before being forwardly reflected by coated surface 134 to working distance Z9. Scan line 156 generated by rotation of mirror 124 about the FIG. 2D position is swept in the same direction as scan line 150.

Figure 2E:
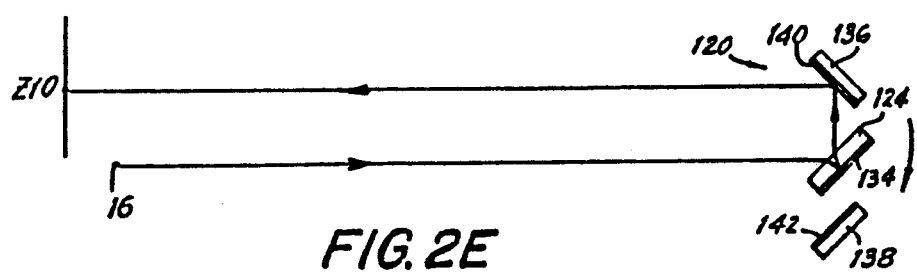
FIG. 2E is a view analogous to FIG. 2D, but at an additional stage of scanning.

Scan line 158 is generated by rotation of mirror 124 about the FIG. 2E position in a manner analogous to that described earlier in connection with FIG. 2C, except that the beam exiting mirror 124 is directed instead to the other side mirror 136 prior to forward reflection to a symbol located at working distance Z10.

Figure 2F:
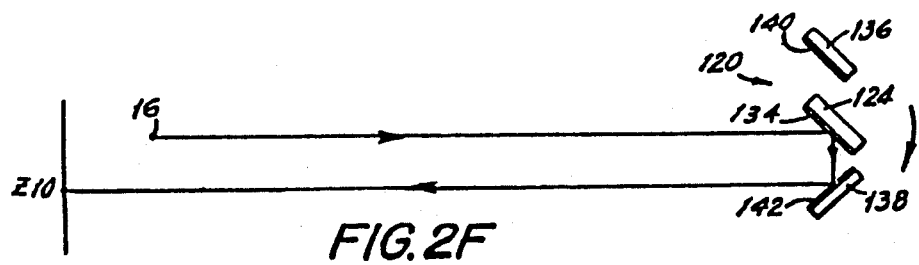
FIG. 2F is a view analogous to FIG. 2E, but at a further stage of scanning.

Scan line 160 is generated by rotation of mirror 124 about the FIG. 2F position in a manner analogous to that described earlier in connection with FIG. 2B, except that the beam leaving mirror 124 is directed to the other side mirror 138 prior to reflection forwardly to a symbol located at working distance Z10. Scan line 160, as well as scan line 158, are swept in the same direction as scan line 152.

As best shown in FIG. 1, it will be noted that the scan pattern 144 comprises a plurality of scan lines in mutual parallelism, with scan lines 150, 156 swept from left to right, and with the remaining scan lines 152, 154, 158 and 160 swept from right to left. All the scan lines are spread apart over the height of the symbol. This spread can be controlled by, and is a function of, the thickness $T_3$ of mirror 124, the angle $\theta$ of incidence of the laser beam on mirror 124, and the index of refraction $n'$ of mirror 124, the latter being preferably constituted of glass. Also, as shown in FIGS. 2A through 2F, the beam spot is focused and alternately located at either working distance Z9 or Z10, thereby obtaining a zooming function.

Figure 4:
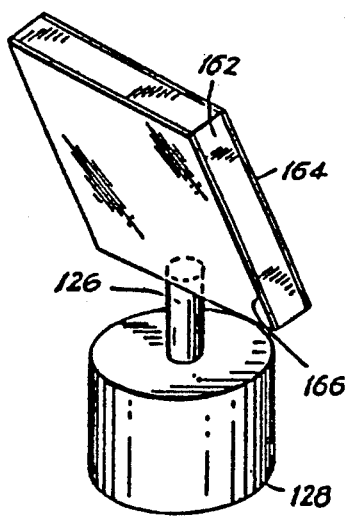
FIG. 4 is a perspective view of still another scan pattern generator.
Figure 5:
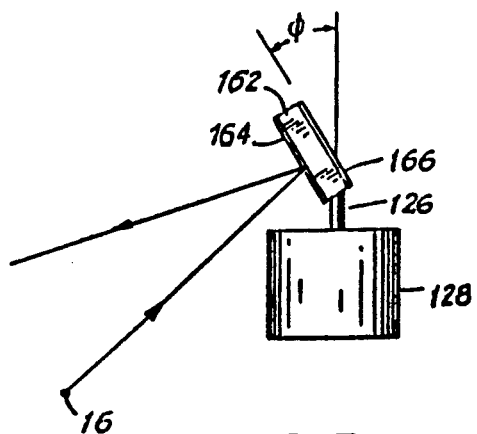
FIG. 5 is a front view of the scan pattern generator of FIG. 4 during one stage of scanning.
Figure 6:
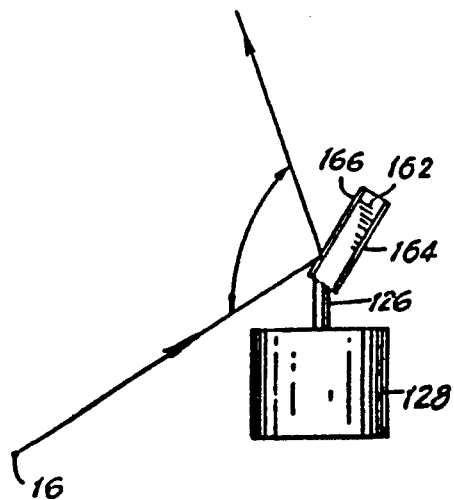
FIG. 6 is a view analogous to FIG. 5, but during another stage of scanning.

Another way or spreading multiple scan lines apart from one another is to replace the vertically extending mirror 124 having a single coated surface with a tilted mirror 162, as shown in FIGS. 4–6, which has two light-reflecting coated surfaces 164, 166 on opposite sides thereof. The tilted mirror 162 is mounted on a shaft 126 of a motor drive 128 at an angle relative to the vertical. When impinged by a light beam emitted by laser source 16, either the coated surface 164 which is oriented at angle $\phi$, or the coated surface 166 which is oriented at an angle supplementary to $\phi$ will face the source 16. The different angles of inclination of the coated surfaces of mirror 162 results in the desired angular spread between the scan lines.

Figure 7:
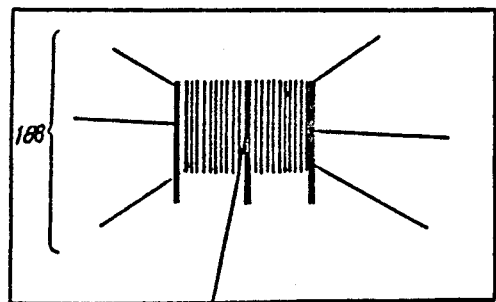
FIG. 7 is a perspective view of yet another scan pattern generator in accordance with this invention, and diagrammatically illustrating one scan pattern.
Figure 7A:
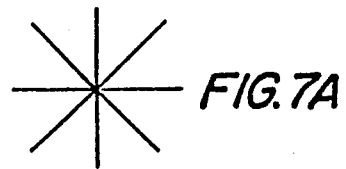
FIG. 7A is a diagrammatic illustration of another scan pattern.
Figure 7B:
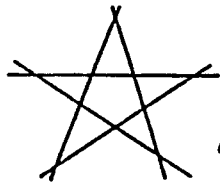
FIG. 7B is a diagrammatic illustration of yet another scan pattern.
Figure 7C:
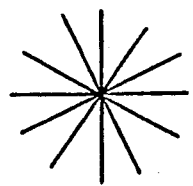
FIG. 7C is a diagrammatic illustration of still another scan pattern.
Figure 7D:
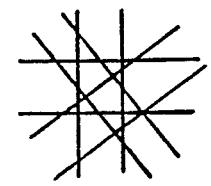
FIG. 7D is a diagrammatic illustration of a further scan pattern.
Figure 7:
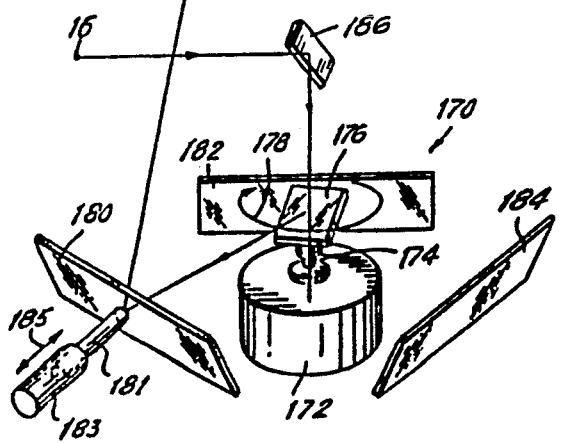

An omni-directional scan line pattern generator 170 is illustrated in FIG. 7, and is operative for generating intersecting line patterns. The generator 170 is simple in construction and comprises a drive motor 172 having a vertical output shaft 174 on which a front surface planar mirror 176 is fixedly mounted for rotation in the circumferential direction of arrow 178. A plurality of inclined reflecting side mirrors 180, 182, 184 are equiangularly distributed about the vertical shaft 174. The side mirrors are positioned in the light path of a laser beam emitted from source 16 and directed by over-head folding mirror 186 to the center mirror 176.

Upon rotation of center mirror 176, the laser beam is successively directed to mirrors 180, 182, 184 each in its turn, for reflection toward a symbol to be read. The resulting multiple line pattern 188 covers the symbol in the FIG. 7 embodiment with three intersecting lines. If four, eight, six, or five mirrors were equiangularly distributed about vertical shaft 174, then the patterns depicted in FIGS. 7A, 7B, 7C and 7D, respectively, would be generated during each revolution of the center mirror 176.

A drive, such as a piston rod 181, reciprocally movable relative to a cylinder 183 along the directions of double-headed arrow 185, is connected to any one of the side mirrors, e.g. 180. As the side mirror 180 is moved radially toward and away from the axis of rotation of the center mirror 176, the focused scan line associated with the side mirror 180 is located at different working distances, thereby achieving a zooming function.

Figure 8:
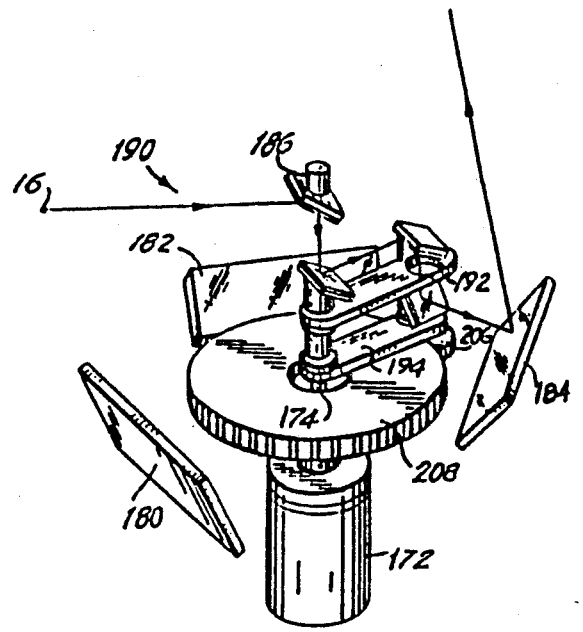
FIG. 8 is a perspective view of a further scan pattern generator in accordance with this invention.
Figure 9:
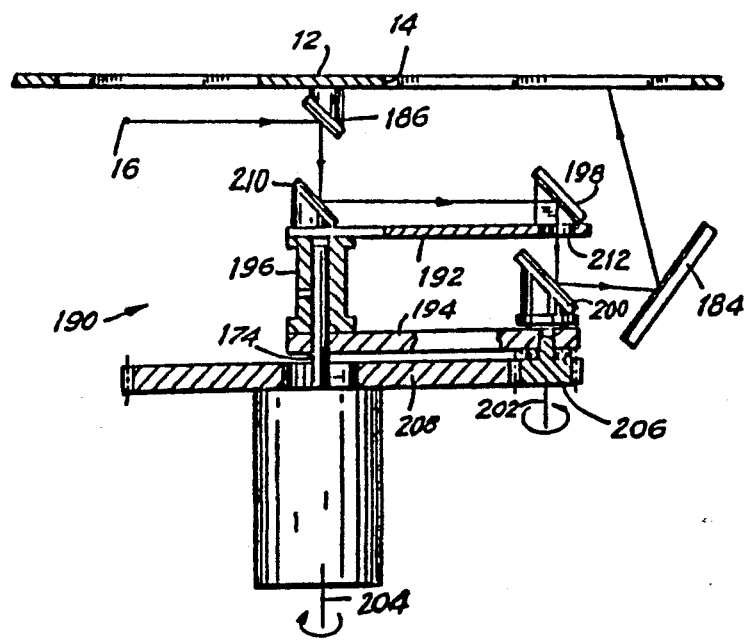
FIG. 9 is a sectional view of the further scan pattern generator of FIG. 8.

Another omni-directional scan line pattern generator 190 is illustrated in FIGS. 8 and 9, and generates not only intersecting scan line patterns, but also individual scan lines which are located at different working distances from the housing, thereby achieving a zooming function. As before, a drive motor 172 rotates a vertically oriented output shaft 174. A plurality of inclined side reflecting mirrors 180, 182, 184 are aquiangularly arranged about the shaft 174. A housing 12 having exit aperture 14 also supports an overhead folding mirror 186 to which a laser beam from source 16 is directed.

Rather than rotating a single mirror on shaft 174, as proposed by the previous embodiment, this embodiment proposes mounting a mirror assembly on the shaft 174. This mirror assembly includes elongated upper and lower bars 192, 194 whose inner ends are fixed to shaft 174 and rotatable therewith in mutual parallelism. The bars 192, 194 are axially spaced apart by spacer 196. At the outer ends of bars 192, 194 are respectively supported mirrors 198, 200. Mirror 198 is stationarily mounted at the outer end of bar 192. Mirror 200 is mounted for rotation about axis 202 which is parallel to vertical axis 204 of the shaft 174. Mirror 200 is mounted at the outer end of bar 194 on a central shaft of a planetary gear 206 having exterior gear teeth which meshingly engage with exterior gear teeth of a stationary sun gear 208. Sun gear 208 coaxially surrounds the shaft 174 and is stationarily mounted on the housing of motor 172. Gears 206, 208 are circular, and sun gear 208 has a much larger diameter than that of planetary gear 206, so that mirror 200 is rotated at a high angular speed about its axis 202.

Another mirror 210 is fixedly mounted at the inner end of bar 192, and is located in the optical path of light reflected from overhead mirror 186. The light reflected from mirror 210 is directed to stationary mirror 198, whereupon the reflected light is directed through a hole 212 in bar 192 to the rotary mirror 200 located underneath hole 212.

In operation, light from source 16 is directed along an optical path by successive reflections off mirrors 186, 210, 198 and 200 prior to being directed to side mirrors 180, 182, 184. The relative positions of mirrors 210 and 198 are fixed relative to each other during rotation of the mirror assembly. At the same time that shaft 174 rotates, the mirror 200 experiences a dual movement. First, the mirror 200 rotates about its axis 202 with an angular speed proportional to the ratio of the diameters of gears 206, 208. Second, the mirror 200 is moved along a circular annulus concentric with axis 204. Hence, the light reflected off mirror 200 will, for each revolution of mirror 200 about axis 202, sequentially impinge on side mirrors 180, 182, 184 which are inclined to direct successive scan beams out through port 14. Due to the diversion of light and the different optical paths between the rotary mirror 200 and the side mirrors 180, 182, 184 at any one moment, at least some of the scan lines are positioned closer in to the housing 12 than other scan lines, thereby achieving a zooming action. Also, as the mirror 200 is also orbiting about the axis 204, the working distance generated by reflection from any one side mirror is always changing.

A three-dimensional coverage of a symbol can thus be achieved with a very sophisticated pattern together with a zooming action. Of course, more than three side mirrors could have been used to obtain even more coverage. The exit port 14 need not be located above the generator 190, as shown in FIGS. 8 and 9 for use in a socalled "scan-above" system. Alternatively, the port 14 could have been located so as to form a "scan-below" system or even a "scan-out" system.

Figure 10:
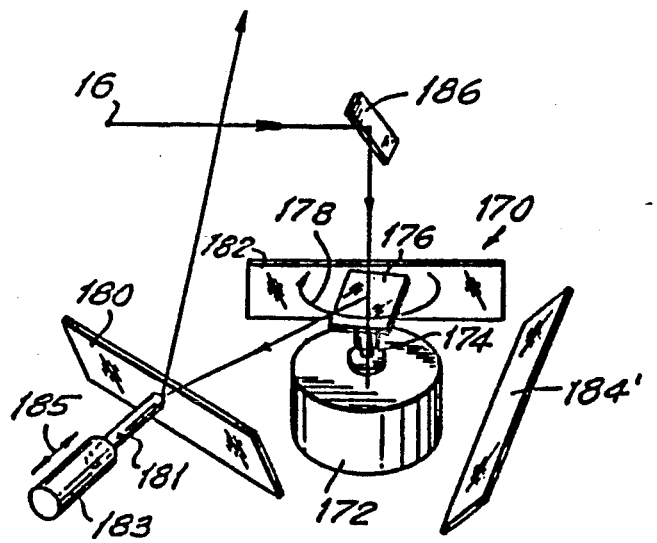
FIG. 10 is a view analogous to FIG. 7, but of yet another scan pattern generator.
Figure 11:
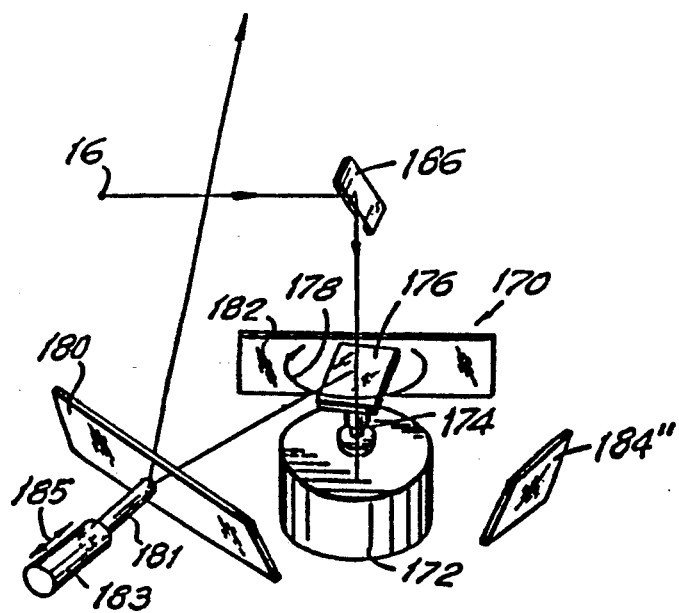
FIG. 11 is a view analogous to FIG. 10, but of an additional scan pattern generator according to this invention.

Two additional omni-directional scan line pattern generators are respectively depicted in FIGS. 10 and 11, wherein like parts with the generator shown in FIG. 7 are identified with like reference numerals. FIG. 10 shows an embodiment wherein the inclined side reflecting mirrors are non-equi-angularly arranged about the shaft 174. Specifically, mirror 184' is located closer to mirror 182 than to mirror 180. This arrangement causes the scan line associated with mirror 184' to be oriented at a different angle relative to the scan line associated with mirror 182, as compared to the scan line associated with mirror 180.

FIG. 11 shows an embodiment wherein the inclined side reflecting mirrors have different lengths. Mirrors 180 and 182 have the same length, but mirror 184" is shorter in length. This arrangement causes the scan line associated with mirror 184" to be shorter in length than the scan line associated with either mirror 182 or mirror 180.

Hence, by changing the angular spacing between the side mirrors (FIG. 10) or by changing the lengths of individual side mirrors (FIG. 11), many different scan line patterns can be generated to suit a particular application.

Although the preceding description has been rendered in terms of laser scanning systems and arrangements for optically modifying laser beams, it will be expressly understood that this invention is not intended to be so limited and, in fact, is intended to include non-laser light sources and beams, including non-coherent and coherent light sources such as light-emitting diode sources, incandescent light sources, gas discharge sources, etc.

Figure 12:
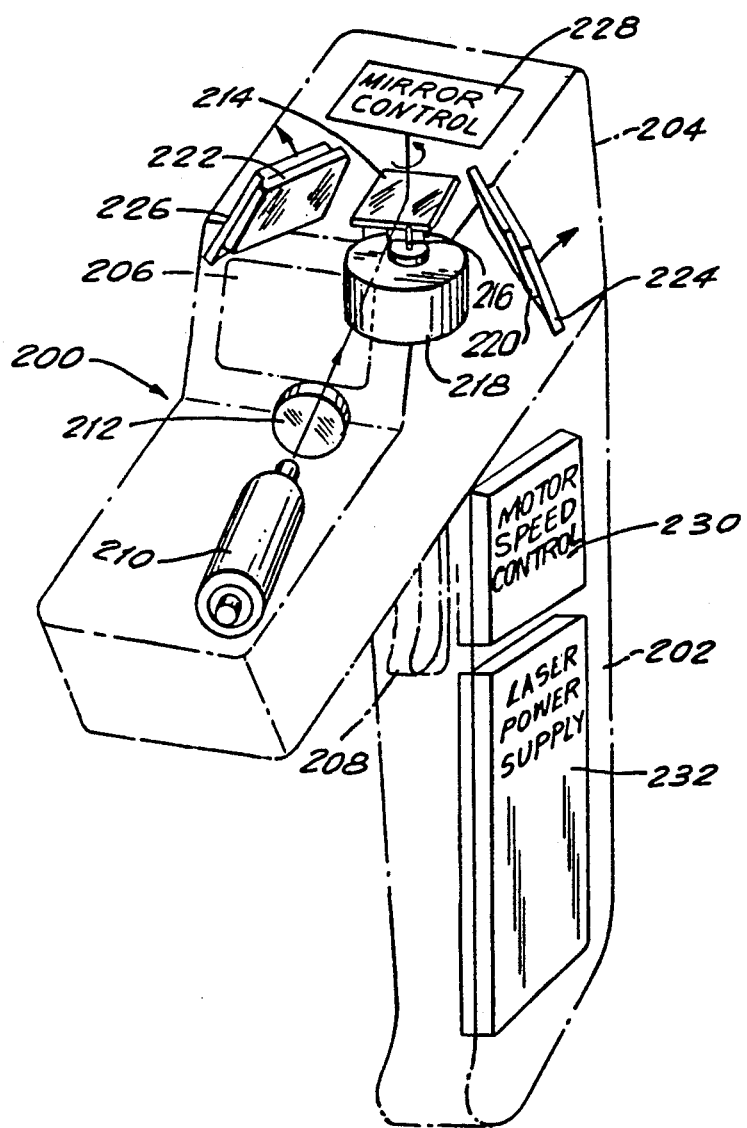
FIGS. 12–13 are views analogous to FIG. 1 of additional system features.
Figure 13:
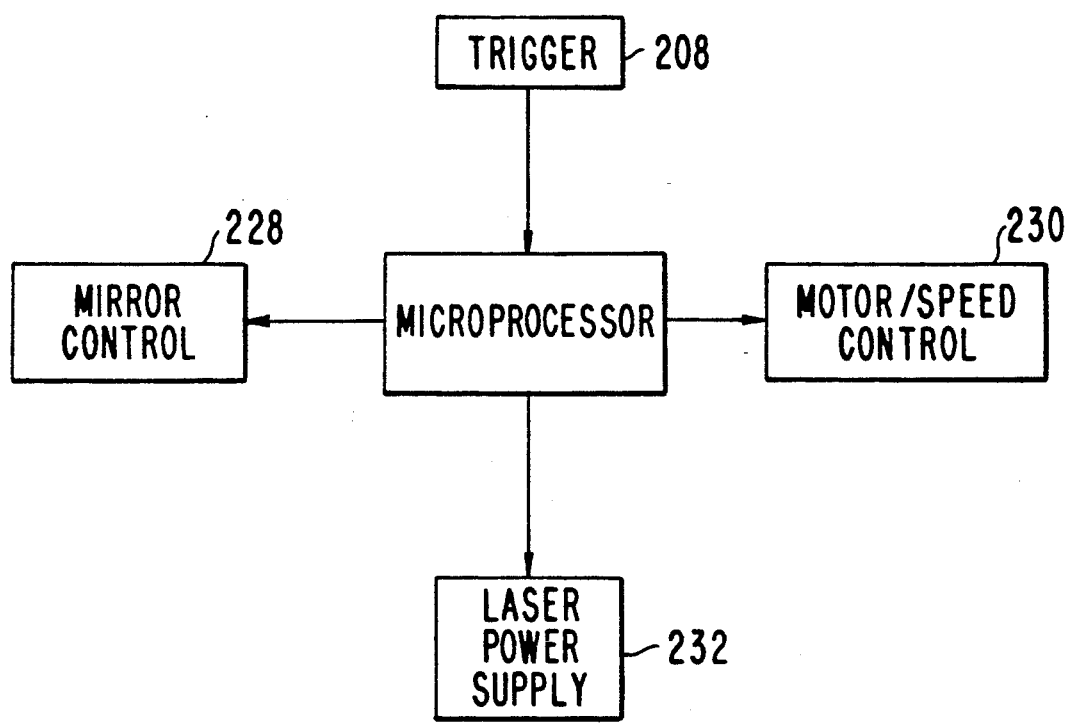

Turning now to FIG. 12, the hand-held scanner 200 has a handle 202, a barrel 204, an exit window 206, and a trigger 208 manually operative among various states by an operator. A light source, e.g. a laser tube 210, a laser diode, a non-laser source, etc., directs a light beam of a certain intensity through an optical component 212 for impingement on a central rotary mirror 214 mounted on a shaft 216 of a drive motor 218 operative for turning the central mirror 214 in a circumferential direction about a drive axis.

A plurality of folding mirrors 220, 222 arranged about the drive axis normally intercepts the light beam reflected off the central mirror 214, and direct the light beam outwardly of the window 206 to a symbol. Piezoelectric or bimorph drive elements 224, 226 are respectively mounted at the rears of the folding mirrors 220, 222. The drive elements 224, 226 are electrically connected to a mirror control circuit 228 which, in turn, is electrically connected to the trigger 208.

The drive motor 218 may be electrically connected, in another embodiment, to a motor speed control circuit 230. The laser tube 210 is electrically connected to a laser power supply 232 which, in turn, is electrically connected to the trigger 208.

The trigger is normally depressible among an off state, a first state and a second state.

In one embodiment, the scan rate at which each scan line of the scan pattern generated by the scanner is varied. For example, in the off state of the trigger, the motor speed control 230 supplies no current to the motor 218 and the central mirror 214 is not turned. In the first state, the motor speed control 230 supplies a low magnitude current to the motor in order to turn the central mirror 214 at a slow rate, e.g. 10 revolutions per second, sufficient to read certain symbols. In the second state, the motor speed control 230 supplies a high magnitude current to the motor in order to turn the central mirror 214 at a faster rate, e.g. 40 revolutions per second, sufficient to read certain different symbols.

In another embodiment, the intensity of the light beam is varied. For example, in the off state of the trigger, the power supply 232 supplies no current to the laser 210. In the first state, the power supply 232 supplies a low amplitude current to the laser 210, thereby generating a laser beam of low intensity. In the second state, the power supply 232 supplies a high amplitude current to the laser 210, thereby generating a laser beam of high intensity. Thus, the low intensity beam can be useful for aiming the scanner 200 at a symbol, whereas, the high intensity beam can be used for reading the symbol. In certain applications, both the high and the low intensity beams can be used for reading symbols, the low intensity beam conserving power.

Rather than employing a controlled power supply to change the intensity of the laser beam, one of the mirrors, e.g. the central mirror 214, could be provided with different light-absorptive coatings on its front and rear surfaces. Each coating, thus, absorbs more and less light during each revolution of the central mirror.

In still another embodiment, the scan direction of at least one of the scan lines is changed by reversing the direction of the motor 218. Thus, in the off state of the trigger, the motor speed control 230 supplies no current to the motor. In the first state of the trigger, the motor speed control 230 supplies a control signal for turning the central mirror 214 in one circumferential direction. In the second state of the trigger, the motor speed control 230 supplies a control signal for turning the central mirror 214 in the opposite circumferential direction. The different directions of rotation, in turn, correspond to different scan directions for each scan line.

In yet another embodiment, the scan pattern generated by the scanner is changed. For example, in the off state of the trigger, no scan pattern is generated. In the first state, a first scan pattern is generated. A suitable microprocessor is shown in FIG. 4 of U.S. Pat. No. 4,896,026 and described at col. 8, lines 27-66 of said patent. In the second state, a second scan patterns is generated. Each scan pattern overlies the symbol. Each scan pattern can, for example, be one or more beam spots, a single scan line, or a set of mutually parallel scan lines (see FIG. 1), or a set of intersecting scan lines (see FIGS. 7A-7D), or a curvilinear pattern, or an omnidirectional pattern, or, in short, just about any pattern at all. Each scan pattern can be useful for reading different types of symbols. Or, one scan pattern can be useful for aiming the scanner at a symbol.

In order to generate different scan patterns as a function of actuating the trigger, one or more of the folding mirrors may be moved, or the total number of the folding mirrors may be changed. To that end, movement of each folding mirror can be obtained upon energization of the mirror control circuit 228 to actuate the piezoelectric or bimorph drive elements 224, 226. Other types of mirror drives can also be used.

Rather than employing a multi-state trigger, a separate manually-operable switch can be mounted on the scanner. Alternatively, a software program can be incorporated into a microprocessor for the scanner. The microprocessor can automatically control the power supply 232, motor speed control 230, or mirror control 228 after each scan, or after a predetermined number of scans, or after a predetermined time has elapsed, or after a symbol has not been successfully decoded within a predetermined time interval, or after a symbol has been successfully decoded and read. Other variations are, of course, possible.

It will be understood that each of the elements described above, or two or more together, also may find a useful application in other types of constructions differing from the types described above.

While the invention has been illustrated and described as embodied in scan pattern generators for bar code symbol readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement in a light scanning system for reading coded indicia, comprising:
   (a) a housing having an exit port;
   (b) scanner means in the housing for directing a light beam along an optical path through the exit port exteriorly of the housing to a coded indicium to be read, including
      (i) a main mirror mounted in the optical path for turning movement about a turning axis,
      (ii) a plurality of folding mirrors surrounding and facing the main mirror, and
      (iii) a reversible drive operatively connected to the main mirror;
   (c) control means for controlling the reversible drive, including an actuator actuatable from an off state to a first operational state in which the reversible drive only turns the main mirror in one circumferential direction about the turning axis to direct the light beam impinging on the main mirror to the folding mirrors for sequential reflection therefrom, and to sweep the light beams sequentially reflected off the folding mirrors in a corresponding plurality of first scans, one following directly after another, across the coded indicium; and
   (d) said actuator being further actuatable from the first operational state to a second operational state in which the reversible drive only turns the main mirror in a circumferential direction opposite to said one circumferential direction about the turning axis to direct the light beam impinging on the main mirror to the folding mirrors for sequential reflection therefrom, and to sweep the light beams sequentially reflected off the folding mirrors in a corresponding plurality of second scans, one following directly after another, across the coded indicium.

2. The arrangement as recited in claim 1, wherein the actuator is a trigger switch.

3. The arrangement as recited in claim 1, wherein the drive is an electrical motor having an output shaft on which the main mirror is mounted.

4. The arrangement as recited in claim 1, wherein the main mirror and each folding mirror are generally rectangular, planar mirrors.

5. The arrangement as recited in claim 1, wherein the folding mirrors are equiangularly arranged about the axis.

6. A method of reading coded indicia, comprising the steps of:
   (a) generating a light beam;
   (b) directing the light beam along an optical path to an indicium to be read;
   (c) mounting a main mirror on a reversible drive in the optical path for impingement by the light beam;
   (d) surrounding the main mirror with a plurality of folding mirrors facing the main mirror for sequential impingement by light reflected off the main mirror;
   (e) controlling the reversible drive by actuating an actuator form an off state to a first operational state in which the main mirror is only turned by the reversible drive in one circumferential direction about a turning axis to direct the light beam impinging on the main mirror to the folding mirrors for sequential reflection therefrom, and to sweep the light beams sequentially reflected off the folding mirrors in a corresponding plurality of first scans, one following directly after another, across the indicia; and
   (f) actuating said actuator form the first operational state to a second operational state in which the reversible drive only turns the main mirror in a circumferential direction opposite to said one circumferential direction about the turning axis to direct the light beam impinging on the main mirror to the folding mirrors for sequential reflection therefrom, and to sweep the light beams sequentially reflected off the folding mirrors in a corresponding plurality of second scans, one following directly after another, across the indicia.

7. The method as recited in claim 6; and further comprising the step of mounting the actuator on a hand-held housing.

8. The method as recited in claim 6, wherein the mounting step is performed by mounting the main mirror on an output shaft of an electrical motor which constitutes the drive.

9. The method as recited in claim 6, wherein the surrounding step is performed by equiangularly arranging the folding mirrors about the axis.

* * * * *